United States Patent
Yang et al.

(10) Patent No.: US 12,466,734 B2
(45) Date of Patent: Nov. 11, 2025

(54) PREPARATION METHOD OF HIGH-SAFETY HIGH-CAPACITY LITHIUM MANGANESE IRON PHOSPHATE

(71) Applicant: HUBEI RT ADVANCED MATERIALS GROUP COMPANY LIMITED, Huangshi (CN)

(72) Inventors: Ji Yang, Huangshi (CN); Yihua Wei, Huangshi (CN); Jie Sun, Huangshi (CN); Zhonglin He, Huangshi (CN); Jianhao He, Huangshi (CN); Shuo Lin, Huangshi (CN); Cheng Xu, Huangshi (CN); Pingjun Lin, Huangshi (CN); Chao Liu, Huangshi (CN); Menghua Yu, Huangshi (CN); Hongfu Qi, Huangshi (CN); Xiong Wang, Huangshi (CN); Zhengchuang Cheng, Huangshi (CN)

(73) Assignee: HUBEI RT ADVANCED MATERIALS GROUP COMPANY LIMITED, Huangshi (CN)

( * ) Notice: Subject to any disclaimer, the term of this patent is extended or adjusted under 35 U.S.C. 154(b) by 458 days.

(21) Appl. No.: 17/979,792

(22) Filed: Nov. 3, 2022

(65) Prior Publication Data
US 2023/0060433 A1 Mar. 2, 2023

(30) Foreign Application Priority Data

May 25, 2022 (CN) .......................... 202210579213.9
Aug. 5, 2022 (CN) .......................... 202210935979.6

(51) Int. Cl.
*C01B 25/45* (2006.01)
*C01B 25/37* (2006.01)

(52) U.S. Cl.
CPC ............ *C01B 25/45* (2013.01); *C01B 25/375* (2013.01); *C01B 25/377* (2013.01); *C01P 2004/61* (2013.01); *C01P 2006/40* (2013.01)

(58) Field of Classification Search
CPC ..... C01B 25/45; C01B 25/375; C01B 25/377; C01P 2004/61; C01P 2006/40
See application file for complete search history.

(56) References Cited

U.S. PATENT DOCUMENTS

| | | | |
|---|---|---|---|
| 2001/0021472 A1 | 9/2001 | Barker et al. | |
| 2010/0202951 A1 | 8/2010 | Wu et al. | |
| 2014/0127111 A1 | 5/2014 | Tahara | |
| 2015/0311505 A1* | 10/2015 | Khot | H01M 4/587 252/182.1 |
| 2016/0197347 A1* | 7/2016 | Paquette | C01B 25/39 252/506 |

* cited by examiner

*Primary Examiner* — Michael N Orlando
(74) *Attorney, Agent, or Firm* — Hemisphere Law, PLLC; Zhigang Ma

(57) ABSTRACT

The present disclosure belongs to technical field of cathode materials of lithium batteries, and discloses a preparation method of high-safety high-capacity lithium manganese iron phosphate. The method includes the steps: (1) synthesizing a ferrous phosphate precursor through a co-precipitation process, and sintering to obtain an anhydrous ferrous phosphate precursor; (2) synthesizing a manganese phosphate precursor through co-precipitation process, and sintering to obtain an anhydrous manganese phosphate precursor; (3) adding lithium phosphate and deionized water into anhydrous ferrous phosphate precursor, and performing ball milling and wet sanding to obtain slurry A; (4) adding lithium phosphate, an organic carbon source, a dispersant, a dopant and deionized water into anhydrous manganese phosphate precursor, and performing ball milling and wet sanding to obtain slurry B; and (5) mixing slurry A with slurry B, and performing ball milling, spray drying, sintering and air jet pulverization to obtain high-safety high-capacity lithium manganese iron phosphate.

7 Claims, 8 Drawing Sheets

PREPARATION METHOD OF HIGH-SAFETY HIGH-CAPACITY LITHIUM MANGANESE IRON PHOSPHATE

TECHNICAL FIELD

The present disclosure belongs to the technical field of lithium battery cathode materials, and particularly discloses a preparation method of high-safety high-capacity lithium manganese iron phosphate.

BACKGROUND

At present, novel lithium battery cathode materials are developed around high-voltage platforms and manganese-based materials, and the earliest commercialized lithium battery cathode material in its branch system is lithium manganese iron phosphate. Compared with lithium iron phosphate, the high voltage characteristic of manganese makes lithium manganese iron phosphate have a higher voltage platform, which also leads to a fact that it has higher energy density when the specific capacity is the same, and under the same conditions, the energy density is 10%-20% higher than that of lithium iron phosphate.

Lithium manganese iron phosphate itself also has performance deficiencies. At present, the lithium iron phosphate process is relatively mature and has better safety and stability; Currently, the lithium manganese iron phosphate process is poor in performance and complicated in reaction process, divalent manganese and divalent iron have the possibility of redox so that the finally produced lithium manganese iron phosphate finished product has poor phase homogeneity in the process of preparation; since there is a consecutive conformal octahedron network in the structure, motion of lithium ions in a one-dimensional pathway is limited, leading to poor material conductivity.

SUMMARY

In order to solve the defects in the prior art, the objective of the present disclosure is to provide a high-safety high-capacity lithium manganese iron phosphate material. The high-safety high-capacity Lithium manganese iron phosphate material has a more homogeneous phase and stronger slurry stability, and further improves the capacity and compaction of the material.

In order to realize the above objective, the present disclosure uses the following technical solution:

Provided is a preparation method of high-safety high-capacity lithium manganese iron phosphate, comprising the following steps:

(1) mixing an iron source, a phosphorous source and an antioxidant into a solution, introducing nitrogen into the solution to serve as a protective gas to prevent oxidization, and synthesizing a ferrous phosphate precursor through a co-precipitation process, sintering the obtained ferrous phosphate precursor, and then removing all crystallized water to obtain an anhydrous ferrous phosphate precursor;

(2) mixing a manganese source, a phosphorous source and an antioxidant into a solution, introducing nitrogen into the solution to serve as a protective gas to prevent oxidization, and synthesizing a manganese phosphate precursor through the co-precipitation process, and sintering the obtained phosphorous source to obtain an anhydrous manganese phosphate precursor;

(3) adding lithium phosphate and deionized water into the anhydrous ferrous phosphate precursor obtained in step (1), and performing ball milling and wet sanding to obtain slurry A;

(4) adding lithium phosphate, an organic carbon source, a dispersant, a dopant and deionized water into the anhydrous manganese phosphate precursor obtained in step (2), and performing ball milling and wet sanding to obtain slurry B; and (5) mixing the slurry A obtained in step (3) with the slurry B obtained in step (4), and performing ball milling, spray drying, sintering and air jet pulverization to obtain high-safety high-capacity lithium manganese iron phosphate.

Preferably, in step (1), the iron source is ferrous sulfate, and the phosphorus source is one or more of phosphoric acid, ammonium dihydrogen phosphate and diammonium hydrogen phosphate; the antioxidant agent is ascorbic acid; the chemical formula of the ferrous phosphate precursor is $Fe_3(PO_4)_2 \cdot 8H_2O$; the sintering is carried out in a box furnace at the sintering temperature of 350-600° C. for 1-5 h at the sintering atmosphere of nitrogen.

Preferably, in step (2), the manganese source is manganese sulfate; the phosphorus source is one or more of phosphoric acid, ammonium dihydrogen phosphate and diammonium hydrogen phosphate; the antioxidant agent is ascorbic acid; the chemical formula of the manganese phosphate precursor is $Mn_3(PO_4)_2 \cdot 7H_2O$; the sintering is carried out in the box furnace at the sintering temperature of 350-600° C. for 1-5 h at the sintering atmosphere of nitrogen.

Preferably, in step (3), a molar ratio Fe/P in the slurry A is 0.958-0.998, a molar ratio Li/Fe in the slurry A is 1.025-1.055; in the wet sanding, the particle size of the slurry A is controlled to D50=0.30-0.60 μm.

Preferably, in step (4), a molar ratio Mn/P in the slurry B is 0.958-0.998, a molar ratio Li/Mn in the slurry B is 1.025-1.055; in the wet sanding, the particle size of the slurry B is controlled to D50=0.20-0.50 μm.

Preferably, in step (4), the organic carbon source is a mixture of glucose and polyethylene glycol, the addition amount of glucose is 5-10 wt % of the weight of the anhydrous manganese phosphate precursor; the addition amount of polyethylene glycol is 1-5 wt % of the weight of the anhydrous manganese phosphate precursor; the dopant is one or more of titanium dioxide, ammonium metavanadate and niobium pentoxide, and the addition amount of the dopant is 0-2.5 wt % of the weight of the anhydrous manganese phosphate precursor; the dispersant is one or more of anionic polyacrylate dispersant TC108, non-ionic polymer TC311 and non-ionic polymer TC28, and the addition amount of the dispersant is 5-10 wt % of the weight of glucose.

Preferably, in step (5), the ball milling is carried out in a ball mill for 30-60 min; the spray drying is carried out under the atmosphere of nitrogen, an inlet air temperature is controlled to 180-240° C., and an outlet air temperature is controlled to 80-120° C.; the sintering is carried out in the box furnace at the sintering temperature of 600-800° C. for 8-20 h at the sintering atmosphere of nitrogen; in the air jet pulverization, the finally obtained high-safety high-capacity lithium manganese iron phosphate is controlled to have a particle size of D50≥0.30 μm, D50=0.8-1.8 μm and D90≤18 μm.

The present disclosure also provides a high-capacity high-safety lithium manganese iron phosphate material prepared by using the method.

The present disclosure also provides use of a high-capacity high-safety lithium manganese iron phosphate in a lithium battery cathode material.

Compared with the prior art, the present disclosure has the following beneficial effects:

1. The ferrous phosphate precursor and the manganese phosphate precursor reduce the process of reducing trivalent iron and trivalent manganese into bivalent iron and bivalent manganese during the sintering, which avoids the generation of reaction impurities in the phase; sintering and spray drying are carried out under the atmosphere of nitrogen so as to further prevent oxidation of bivalent iron and manganese.
2. The dispersing agent is used in the production process, which ensures that iron and manganese are not oxidized and meanwhile the finished products have pure phases and are not agglomerated; in the process of high-temperature carbonization, organic small molecular substances can be produced by decomposition and have synergistic effect with the carbon source, which is conducive to pore formation of the cathode material and control of crystal morphology to inhibit the growth of crystal grains and relieve agglomerated.
3. On the basis of taking glucose and polyethylene glycol as the main carbon source, the surfaces of inorganic particles are wetted by addition of the dispersant, thereby reducing the viscosity of the slurry to obtain good dispersity and facilitating the solid content of the material and the stability of the slurry.
4. By controlling different sanding sizes of precursors, the ferrous phosphate precursor with a large particle size and the manganese phosphate precursor with a small particle size are evenly mixed, thereby not only reducing the sanding time and improving the grinding efficiency, but also ensuring the mix of the materials and then further improving the capacity and compaction.

DETAILED DESCRIPTION OF THE EMBODIMENTS

Figure 1:
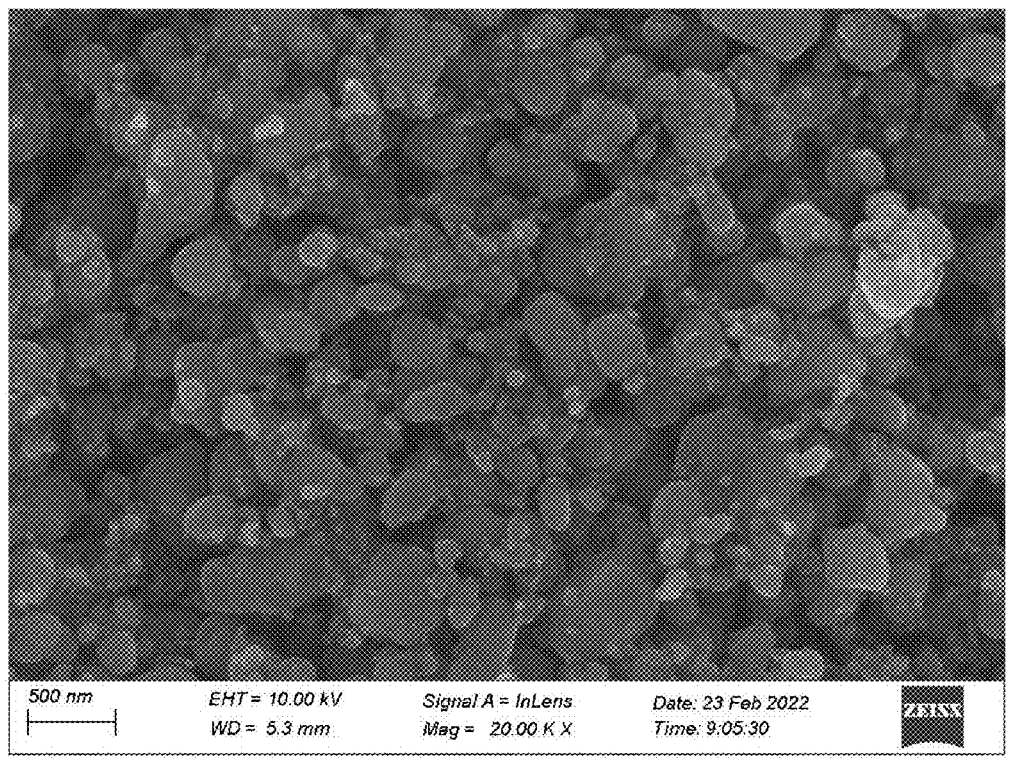
FIG. 1 is a scanning electron microscope (SEM) graph of a sample prepared in Example 1.
Figure 2:
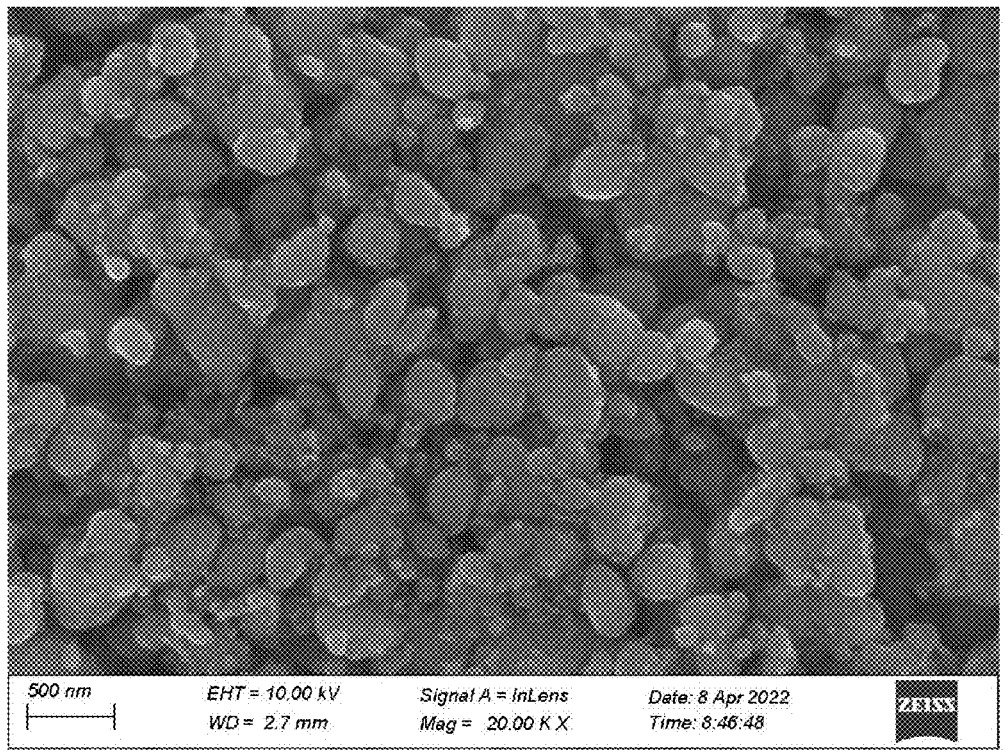
FIG. 2 is an SEM graph of a sample prepared in Example 2.
Figure 3:
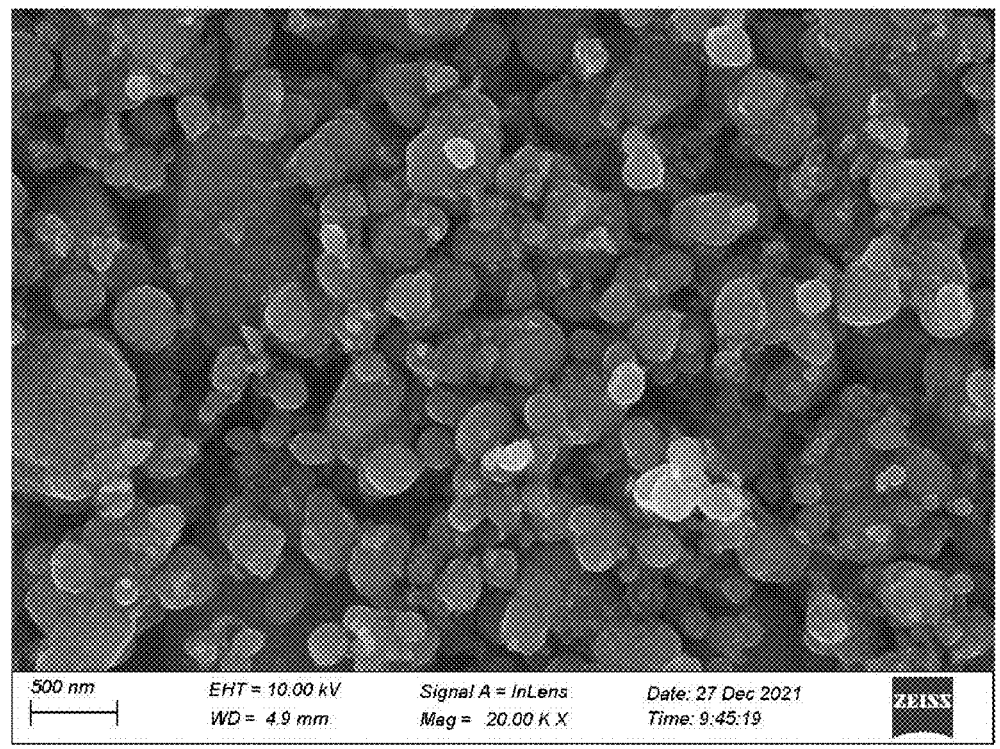
FIG. 3 is an SEM graph of a sample prepared in Example 3.
Figure 4:
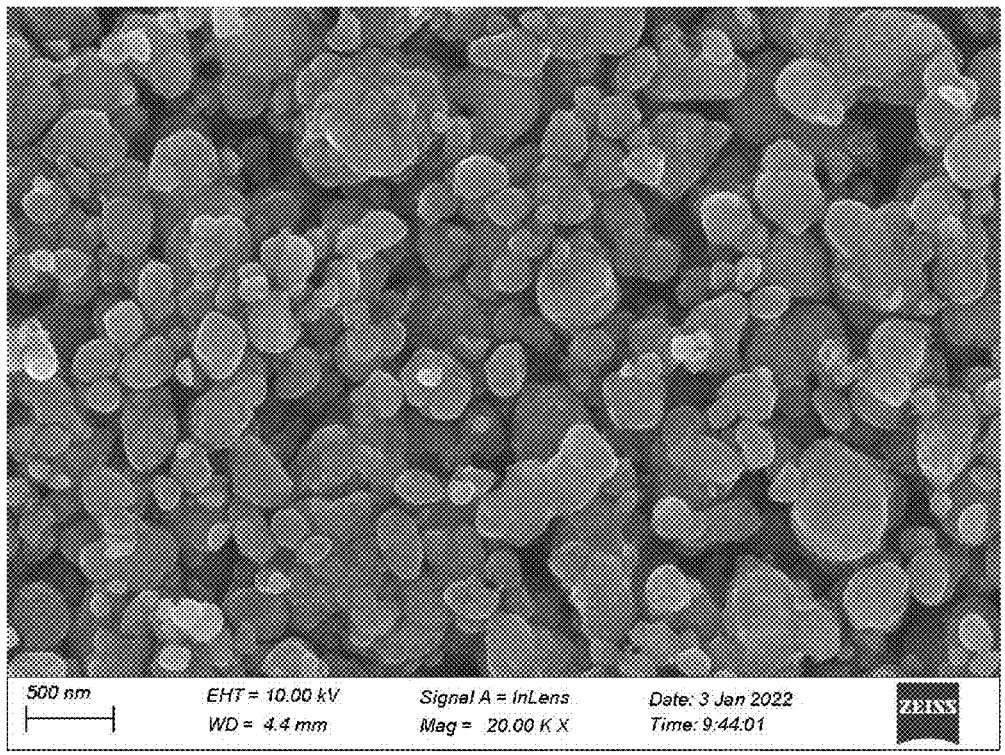
FIG. 4 is an SEM graph of a sample prepared in Example 4.
Figure 5:
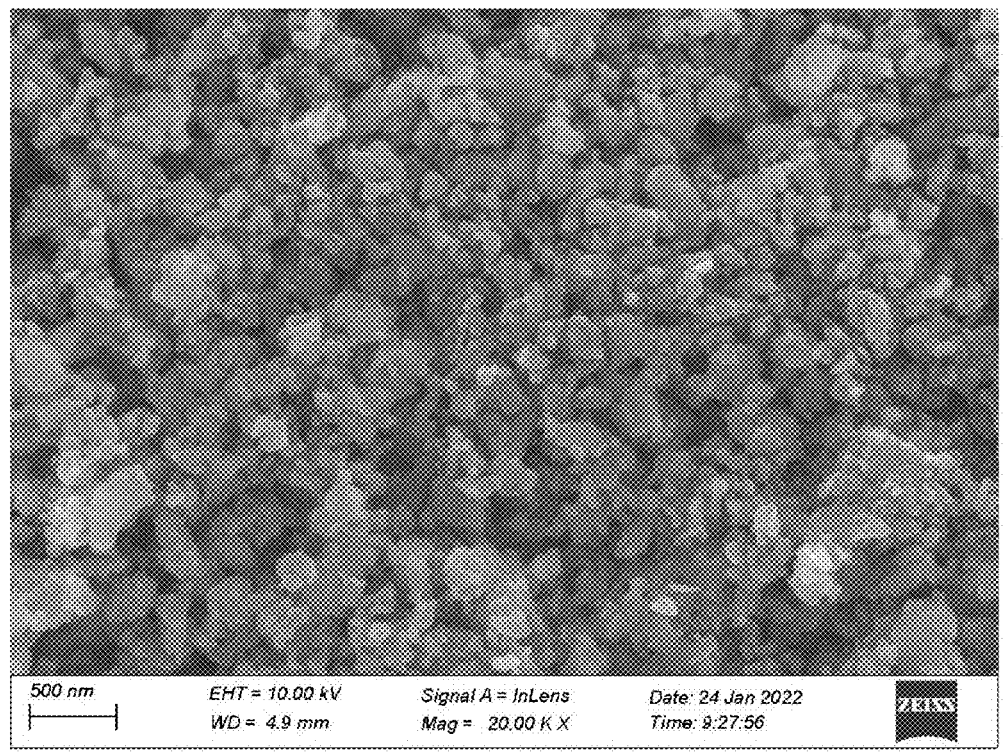
FIG. 5 is an SEM graph of a sample prepared in Comparative example 1.
Figure 6:
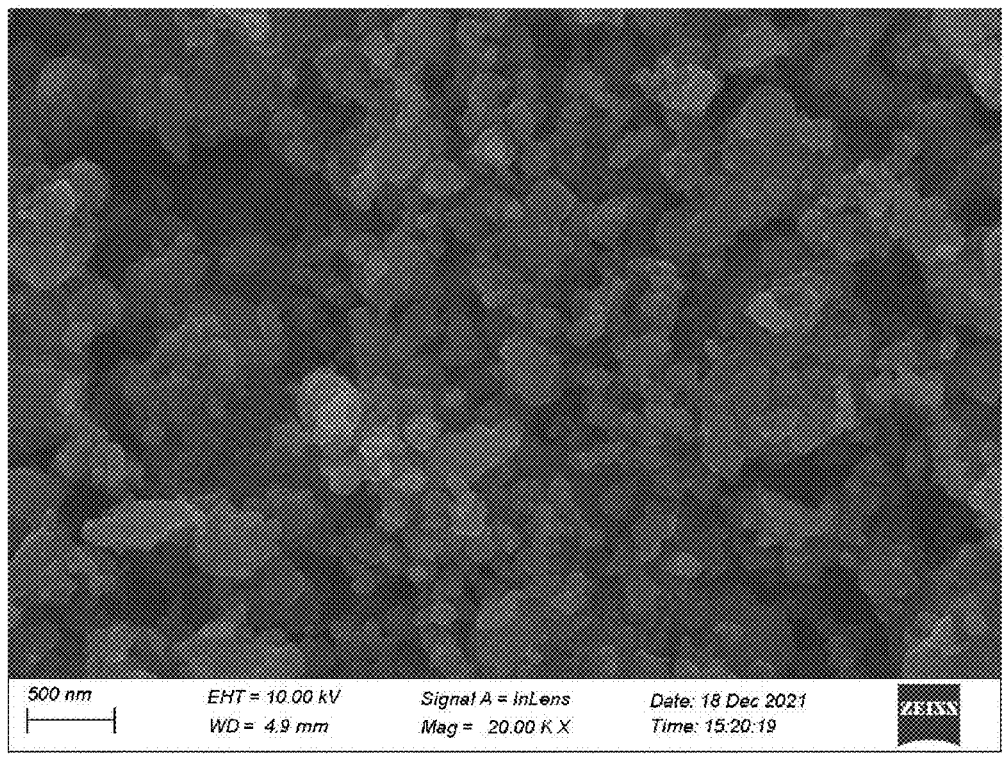
FIG. 6 is an SEM graph of a sample prepared in Comparative example 2.
Figure 7:
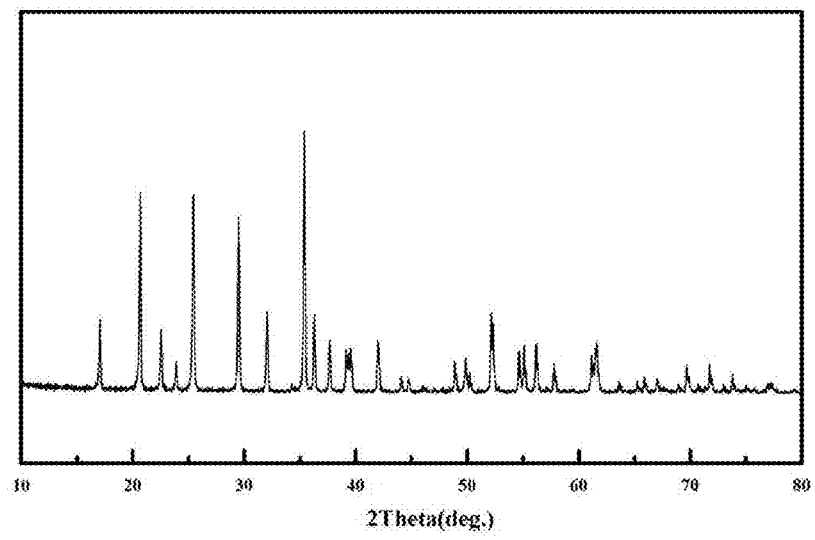
FIG. 7 is an X-ray diffraction (XRD) graph of a sample prepared in Example 1.
Figure 8:
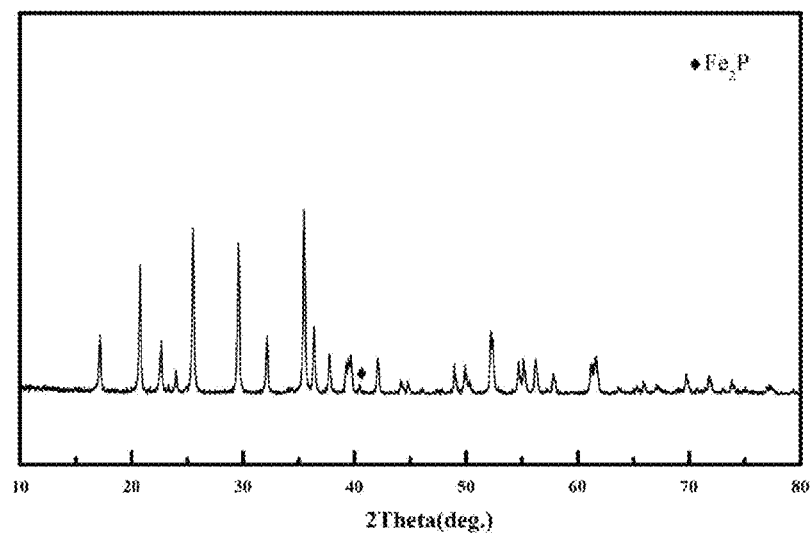
FIG. 8 is an X-ray diffraction (XRD) graph of a sample prepared in Comparative example 1.
Figure 9:
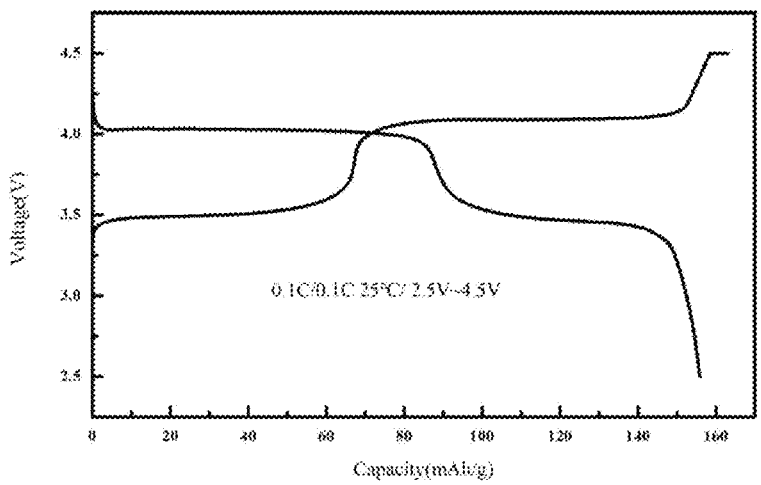
FIG. 9 shows a button battery charge-discharge curve of a sample prepared in Example 1.
Figure 10:
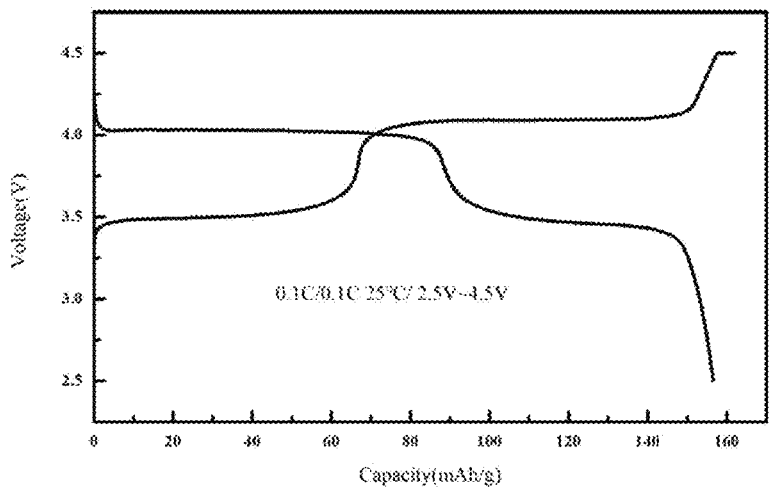
FIG. 10 shows a button battery charge-discharge curve of a sample prepared in Example 2.
Figure 11:
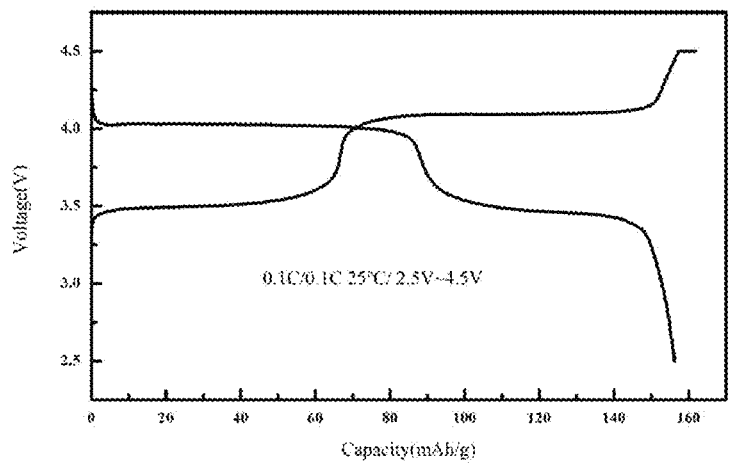
FIG. 11 shows a button battery charge-discharge curve of a sample prepared in Example 3.
Figure 12:
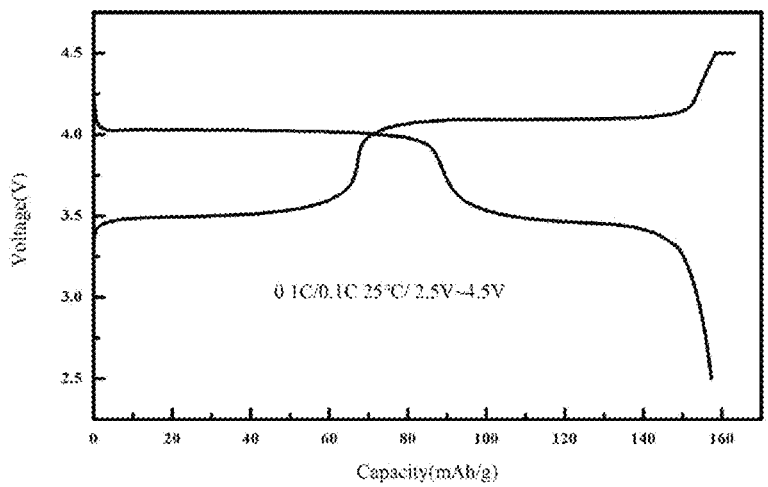
FIG. 12 shows a button battery charge-discharge curve of a sample prepared in Example 4.
Figure 13:
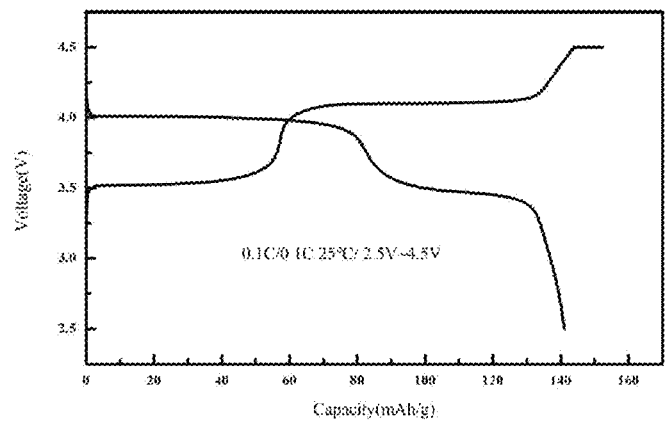
FIG. 13 shows a button battery charge-discharge curve of a sample prepared in Comparative example 1.
Figure 14:
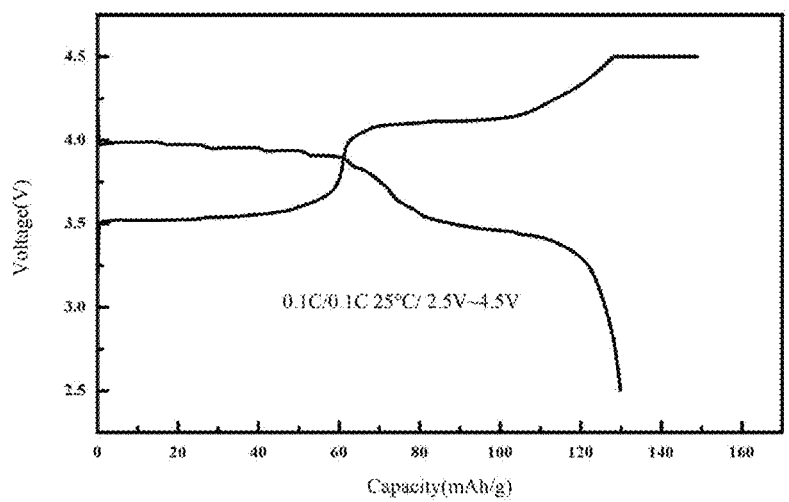
FIG. 14 shows a button battery charge-discharge curve of a sample prepared in Comparative example 2.

For making the objective, technical solution and advantages of the present disclosure more clear, the present disclosure will be further described in detail in combination with examples below. Of course, examples described herein are only for explaining but not limiting the present disclosure.

Although the steps in the present disclosure are arranged with numbers, they are not used to limit the sequence of the steps, and the relative sequence of the steps can be adjusted unless the sequence of the steps is explicitly stated or the execution of a certain step requires other steps as the basis. It should be understood that the term "and/or" used herein involves and covers one or more any and all possible combinations of associated listed items.

Unless otherwise specified, chemical reagents and materials in the present disclosure are commercially available, or are synthesized by raw materials purchased on the market, and the dispersant anionic polyacrylate dispersant TC108, non-ionic polymer TC311 and non-ionic polymer TC28 are purchased from Klein factory.

Example 1

A preparation method of high-safety high-capacity lithium iron manganese phosphate comprises the following steps:

(1) 778 g of ferrous sulfate, 190 g of ammonium dihydrogen phosphate, 10 g of phosphoric acid and 10 g of ascorbic acid were mixed into a solution, nitrogen was introduced into the solution to serve as a protective gas to prevent oxidization, and a ferrous phosphate precursor was synthesized through a co-precipitation method; the obtained ferrous phosphate precursor was sintered for 5 h at the sintering temperature of 400° C. under the atmosphere of nitrogen in a box furnace, and 400 g of anhydrous ferrous phosphate precursor was obtained after all crystallized water was removed;
(2) 1060 g of manganese sulfate, 270 g of phosphoric acid and 10 g of ascorbic acid were mixed into a solution, nitrogen was introduced into the solution to serve as a protective gas to prevent oxidization, and a manganese phosphate precursor was synthesized through a co-precipitation method; the obtained manganese phosphate precursor was sintered for 5 h at the sintering temperature of 400° C. under the atmosphere of nitrogen in a box furnace, and 545 g of anhydrous manganese phosphate precursor was obtained after all crystallized water was removed;
(3) 123.6 g of lithium phosphate and 1100 g of deionized water were added into 500 g of anhydrous ferrous phosphate precursor obtained in step (1), and ball milling and wet sanding were performed to obtain slurry A with a particle size D50=0.55 μm;
(4) 185.4 g of lithium phosphate, 60 g of glucose, 50 g of polyethylene glycol, 8 g of anionic polyacrylate dispersant TC108, 7.71 g of ammonium metavanadate and 1100 g of deionized water were added into 545 g of anhydrous manganese phosphate precursor obtained in step (2), and ball milling and wet sanding were performed to obtain slurry B with a particle size D50=0.35 μm;

(5) the slurry A obtained in step (3) was mixed with the slurry B obtained in step (4), and the obtained mixture was subjected to ball milling for 30 min using a ball mill; spray drying was performed under the atmosphere of nitrogen, an inlet air temperature was controlled to 220° C., and an outlet air temperature was controlled to 100° C.; the above-mentioned mixture was sintered for 15 h in the box furnace under the atmosphere of nitrogen at 750° C. under the in-furnace pressure of 50 Pa, nitrogen was introduced for more than 3 h before heating, a heating rate was controlled to 2° C./min, and subsequently the temperature was naturally reduced to 50° C. with the furnace after completion of sintering; air jet pulverization was performed, and the particle sizes were controlled to D10=0.40 μm, D50=1.0 μm and D90=10 μm, so as to obtain high-safety high-capacity lithium iron manganese phosphate.

Example 2

A preparation method of high-safety high-capacity lithium iron manganese phosphate comprises the following steps:

(1) 972 g of ferrous sulfate, 240 g of ammonium dihydrogen phosphate, 20 g of phosphoric acid and 10 g of ascorbic acid were mixed into a solution, nitrogen was introduced into the solution to serve as a protective gas to prevent oxidization, and a ferrous phosphate precursor was synthesized through a co-precipitation method; the obtained ferrous phosphate precursor was sintered for 4 h at the sintering temperature of 450° C. under the atmosphere of nitrogen in a box furnace, and 500 g of anhydrous ferrous phosphate precursor was obtained after all crystallized water was removed;

(2) 888 g of manganese sulfate, 240 g of phosphoric acid and 10 g of ascorbic acid were mixed into a solution, nitrogen was introduced into the solution to serve as a protective gas to prevent oxidization, and a manganese phosphate precursor was synthesized through a co-precipitation method; the obtained manganese phosphate precursor was sintered for 4 h at the sintering temperature of 450° C. under the atmosphere of nitrogen in a box furnace, and 455 g of anhydrous manganese phosphate precursor was obtained after all crystallized water was removed;

(3) 154.5 g of lithium phosphate and 1100 g of deionized water were added into 500 g of anhydrous ferrous phosphate precursor obtained in step (1), and ball milling and wet sanding were performed to obtain slurry A with a particle size D50=0.35 μm;

(4) 154.5 g of lithium phosphate, 60 g of glucose, 50 g of polyethylene glycol, 6 g of anionic polyacrylate dispersant TC311, 6 g of titanium dioxide and 1100 g of deionized water were added into 455 g of anhydrous manganese phosphate precursor obtained in step (2), and ball milling and wet sanding were performed to obtain slurry B with a particle size D50=0.25 μm;

(5) the slurry A obtained in step (3) was mixed with the slurry B obtained in step (4), and ball milling was performed for 40 min using a ball mill; spray drying was performed under the atmosphere of nitrogen, an inlet air temperature was controlled to 220° C., and an outlet air temperature was controlled to 100° C.; the above-mentioned mixture was sintered for 12 h in the box furnace under the atmosphere of nitrogen at 760° C. under the in-furnace pressure of 60 Pa, nitrogen was introduced for more than 3 h before heating, a heating rate was controlled to 2° C./min, and subsequently the temperature was naturally reduced to 50° C. with the furnace after completion of sintering; air jet pulverization was performed, and the particle sizes were controlled to D10=0.40 μm, D50=1.2 μm and D90=10 μm, so as to obtain high-safety high-capacity lithium iron manganese phosphate.

Example 3

A preparation method of high-safety high-capacity lithium iron manganese phosphate comprises the following steps:

(1) 972 g of ferrous sulfate, 220 g of ammonium dihydrogen phosphate, 40 g of phosphoric acid and 10 g of ascorbic acid were mixed into a solution, nitrogen was introduced into the solution to serve as a protective gas to prevent oxidization, and a ferrous phosphate precursor was synthesized through a co-precipitation method; the obtained ferrous phosphate precursor was sintered for 3 h at the sintering temperature of 500° C. under the atmosphere of nitrogen in a box furnace, and 500 g of anhydrous ferrous phosphate precursor was obtained after all crystallized water was removed;

(2) 585 g of manganese sulfate, 160 g of phosphoric acid and 10 g of ascorbic acid were mixed into a solution, nitrogen was introduced into the solution to serve as a protective gas to prevent oxidization, and a manganese phosphate precursor was synthesized through a co-precipitation method; the obtained manganese phosphate precursor was sintered for 3 h at the sintering temperature of 500° C. under the atmosphere of nitrogen in the box furnace, and 300 g of anhydrous manganese phosphate precursor was obtained after all crystallized water was removed;

(3) 154.2 g of lithium phosphate and 1100 g of deionized water were added into 500 g of anhydrous ferrous phosphate precursor obtained in step (1), and ball milling and wet sanding were performed to obtain slurry A with a particle size D50=0.55 μm;

(4) 102.8 g of lithium phosphate, 60 g of glucose, 50 g of polyethylene glycol, 8 g of anionic polyacrylate dispersant TC28, 6.5 g of niobium pentoxide and 1100 g of deionized water were added into 300 g of anhydrous manganese phosphate precursor obtained in step (2), and ball milling and wet sanding were performed to obtain slurry B with a particle size D50=0.35 μm;

(5) the slurry A obtained in step (3) was mixed with the slurry B obtained in step (4), and ball milling was performed for 50 min using a ball mill; spray drying was performed under the atmosphere of nitrogen, an inlet air temperature was controlled to 200° C., and an outlet air temperature was controlled to 100° C.; the above-mentioned mixture was sintered for 10 h in the box furnace under the atmosphere of nitrogen at 780° C. under the in-furnace pressure of 70 Pa, nitrogen was introduced for more than 3 h before heating, a heating rate was controlled to 2° C./min, and subsequently the temperature was naturally reduced to 50° C. with the furnace after completion of sintering; air jet pulverization was performed, and the particle sizes were controlled to D10=0.40 μm, D50=0.9 μm and D90=10 μm, so as to obtain high-safety high-capacity lithium iron manganese phosphate.

Example 4

A preparation method of high-safety high-capacity lithium iron manganese phosphate comprises the following steps:
(1) 778 g of ferrous sulfate, 180 g of ammonium dihydrogen phosphate, 20 g of phosphoric acid and 10 g of ascorbic acid were mixed into a solution, nitrogen was introduced into the solution to serve as a protective gas to prevent oxidization, and a ferrous phosphate precursor was synthesized through a co-precipitation method; the obtained ferrous phosphate precursor was sintered for 2 h at the sintering temperature of 550° C. under the atmosphere of nitrogen in a box furnace, and 400 g of anhydrous ferrous phosphate precursor was obtained after all crystallized water was removed;
(2) 1060 g of manganese sulfate, 270 g of phosphoric acid and 10 g of ascorbic acid were mixed into a solution, nitrogen was introduced into the solution to serve as a protective gas to prevent oxidization, and a manganese phosphate precursor was synthesized through a co-precipitation method; the obtained manganese phosphate precursor was sintered for 2 h at the sintering temperature of 550° C. under the atmosphere of nitrogen in the box furnace, and 545 g of anhydrous manganese phosphate precursor was obtained after all crystallized water was removed;
(3) 123.6 g of lithium phosphate and 1100 g of deionized water were added into 400 g of anhydrous ferrous phosphate precursor obtained in step (1), and ball milling and wet sanding were performed to obtain slurry A with a particle size D50=0.60 μm;
(4) 185.4 g of lithium phosphate, 60 g of glucose, 50 g of polyethylene glycol, 8 g of anionic polyacrylate dispersant TC28, 6 g of ammonium metavanadate and 1100 g of deionized water were added into 545 g of anhydrous manganese phosphate precursor obtained in step (2), and ball milling and wet sanding were performed to obtain slurry B with a particle size D50=0.50 μm;
(5) the slurry A obtained in step (3) was mixed with the slurry B obtained in step (4), and ball milling was performed for 60 min using a ball mill; spray drying was performed under the atmosphere of nitrogen, an inlet air temperature was controlled to 200° C., and an outlet air temperature was controlled to 90° C.; the above-mentioned mixture was sintered for 10 h in the box furnace under the atmosphere of nitrogen at 780° C. under the in-furnace pressure of 70 Pa, nitrogen was introduced for more than 3 h before heating, a heating rate was controlled to 2° C./min, and subsequently the temperature was naturally reduced to 80° C. with the furnace after completion of sintering; air jet pulverization was performed, and the particle sizes were controlled to D10=0.40 μm, D50=1.5 μm and D90=10 μm, so as to obtain high-safety high-capacity lithium iron manganese phosphate.

Comparative Example 1

A preparation method of lithium iron manganese phosphate comprises the following steps:
(1) 310 g of iron phosphate, 75 g of iron oxide, 123.6 g of lithium phosphate and 1100 g of deionized water were mixed into a solution, and then ball milling and wet sanding were performed to obtain slurry A with a particle size D50=0.55 μm;
(2) 395 g of manganese dioxide B, 300 g of phosphoric acid, 185.4 g of lithium phosphate, 60 g of glucose, 50 g of polyethylene glycol, 8 g of anionic polyacrylate dispersant TC108, 7.71 g of ammonium metavanadate and 1100 g of deionized water were mixed into a solution, and ball milling and wet sand milling to obtain slurry B with particle size D50=0.35 μm;
(3) the slurry A obtained in step (1) was mixed with the slurry B obtained in step (2), and ball milling was performed for 30 min using a ball mill; spray drying was performed under the atmosphere of nitrogen, an inlet air temperature was controlled to 220° C., and an outlet air temperature was controlled to 100° C.; the above-mentioned mixture was sintered for 15 h in the box furnace under the atmosphere of nitrogen at 750° C. under the in-furnace pressure of 50 Pa, nitrogen was introduced for more than 3 h before heating, a heating rate was controlled to 2° C./min, and subsequently the temperature was naturally reduced to 50° C. with the furnace after completion of sintering; air jet pulverization was performed, and the particle sizes were controlled to D10=0.40 μm, D50=1.0 μm and D90=10 μm, so as to obtain lithium iron manganese phosphate.

Comparative Example 2

A preparation method of lithium iron manganese phosphate comprises the following steps:
(1) 778 g of ferrous sulfate, 190 g of ammonium dihydrogen phosphate, 10 g of phosphoric acid and 10 g of ascorbic acid were mixed into a solution, nitrogen was introduced into the solution to serve as a protective gas to prevent oxidization, and a ferrous phosphate precursor was synthesized through a co-precipitation method; the obtained ferrous phosphate precursor was sintered for 5 h at the sintering temperature of 400° C. under the atmosphere of nitrogen in a box furnace, and 400 g of anhydrous ferrous phosphate precursor was obtained after all crystallized water was removed;
(2) 1060 g of manganese sulfate, 270 g of phosphoric acid and 10 g of ascorbic acid were mixed into a solution, nitrogen was introduced into the solution to serve as a protective gas to prevent oxidization, and a manganese phosphate precursor was synthesized through a co-precipitation method; the obtained manganese phosphate precursor was sintered for 5 h at the sintering temperature of 400° C. under the atmosphere of nitrogen in a box furnace, and 545 g of anhydrous manganese phosphate precursor was obtained after all crystallized water was removed;
(3) 123.6 g of lithium phosphate and 1100 g of deionized water were added into 500 g of anhydrous ferrous phosphate precursor obtained in step (1), and ball milling and wet sanding were performed to obtain slurry A with a particle size D50=0.55 μm;
(4) 185.4 g of lithium phosphate, 60 g of glucose, 50 g of polyethylene glycol, 7.71 g of ammonium metavanadate and 1100 g of deionized water were added into 545 g of anhydrous manganese phosphate precursor obtained in step (2), and ball milling and wet sanding were performed to obtain slurry B with a particle size D50=0.35 μm;

(5) the slurry A obtained in step (3) was mixed with the slurry B obtained in step (4), and the obtained mixture was subjected to ball milling for 30 min using a ball mill; spray drying was performed under the atmosphere of nitrogen, an inlet air temperature was controlled to 220° C., and an outlet air temperature was controlled to 100° C.; the above-mentioned mixture was sintered for 15 h in the box furnace under the atmosphere of nitrogen at 750° C. under the in-furnace pressure of 50 Pa, nitrogen was introduced for more than 3 h before heating, a heating rate was controlled to 2° C./min, and subsequently the temperature was naturally reduced to 50° C. with the furnace after completion of sintering; air jet pulverization was performed, and the particle sizes were controlled to D10=0.40 μm, D50=1.0 μm and D90=10 μm, so as to obtain high-safety high-capacity lithium iron manganese phosphate.

The lithium manganese iron phosphate cathode materials prepared from examples 1-4 and comparative examples 1-2 together with Super-P and PVDF were dispersed into NMP in a mass ratio of 80:10:10, the obtained mixture solution was dispersed through ball milling, and then the obtained dispersed solution was coated onto aluminum foil and dried in vacuum to obtain a positive pole piece, wherein an electrolyte was 1 mol/L $LiPF_6$, a solvent volume ratio was EC:DMC:EMC=1:1:1 (volume ratio), a diaphragm was a Celgard polypropylene film, and a lithium metal sheet was an anode, and then the above materials were assembled into a button battery. A range of a test voltage is 2.5 V-4.5 V, charge is performed to 4.5 V in a constant-current constant-voltage charging manner, and the cut-off current is 0.02 C; discharge is performed to 2.5 V in a constant-current discharge manner. Test results are as shown in Table 1:

TABLE 1

Basic performance of lithium manganese iron phosphate material

|  | 0.1 C discharge per gram capacity (mAh/g) | 1 C discharge per gram capacity (mAh/g) | Initial coulombic efficiency (%) |
|---|---|---|---|
| Example 1 | 163.1 | 155.89 | 95.58 |
| Example 2 | 162.07 | 156.6 | 96.62 |
| Example 3 | 161.85 | 156.23 | 96.53 |
| Example 4 | 163.10 | 157.35 | 96.47 |
| Comparative example 1 | 152.41 | 141.07 | 92.56 |
| Comparative example 2 | 149.07 | 129.89 | 87.13 |

Examples 1-4 are high-safety high-capacity lithium manganese iron phosphate prepared in the present disclosure, and comparative examples 1-2 are lithium manganese iron phosphate produced in conventional methods; it can be seen from data that the initial coulomb efficiency and discharge capacity of the high-safety high-capacity lithium manganese iron phosphate prepared in the present disclosure are higher than those of lithium manganese iron phosphate produced in the conventional method, and its conductivity and capacity are higher; it can be seen from the XRD analysis diagrams that lithium manganese iron phosphate prepared by this process has high purity and no impurity phase, the product prepared in comparative example 1 has a $Fe_2P$ impurity phase, so as to lead to decreased product properties; example products and comparative example products are subjected to scanning electron microscope analysis from which it can be seen that the high-safety high-capacity lithium iron manganese phosphate particle prepared in the present disclosure has a uniform size with better uniformity.

Those skilled in the art should be understood that any improvements made to the present disclosure, equivalent replacements to various product raw materials in the present disclosure, addition of auxiliary components and selection of specific modes should fall within the protective scope and public scope of the present disclosure.

What is claimed is:

1. A preparation method of lithium manganese iron phosphate, comprising the following steps:
    S1: mixing an iron source, a phosphorous source and an antioxidant into a solution, introducing nitrogen into the solution to serve as a protective gas to prevent oxidization, and synthesizing a ferrous phosphate precursor through a co-precipitation process, sintering the obtained ferrous phosphate precursor, and then removing all crystallized water to obtain an anhydrous ferrous phosphate precursor;
    S2; mixing a manganese source, a phosphorous source and an antioxidant into a solution, introducing nitrogen into the solution to serve as a protective gas to prevent oxidization, and synthesizing a manganese phosphate precursor through the co-precipitation process, and sintering the obtained phosphorous source to obtain an anhydrous manganese phosphate precursor;
    S3: adding lithium phosphate and deionized water into the anhydrous ferrous phosphate precursor obtained in step S1, and performing ball milling and wet sanding to obtain slurry A;
    S4; adding lithium phosphate, an organic carbon source, a dispersant, a dopant and deionized water into the anhydrous manganese phosphate precursor obtained in step S2, and performing ball milling and wet sanding to obtain slurry B; and
    S5; mixing the slurry A obtained in step S3 with the slurry B obtained in step S4 and performing ball milling, spray drying, sintering and air jet pulverization to obtain high-safety high-capacity lithium manganese iron phosphate.

2. The preparation method of lithium manganese iron phosphate according to claim 1, wherein in step S1, the iron source is ferrous sulfate, and the phosphorus source is one or more of phosphoric acid, ammonium dihydrogen phosphate and diammonium hydrogen phosphate; the antioxidant agent is ascorbic acid; the chemical formula of the ferrous phosphate precursor is $Fe_3(PO_4)_2 \cdot 8H_2O$; the sintering is carried out in a box furnace at the sintering temperature of 350-600° C. for 1-5 h at the sintering atmosphere of nitrogen.

3. The preparation method according to claim 1, wherein in step S2, the manganese source is manganese sulfate; the phosphorus source is one or more of phosphoric acid, ammonium dihydrogen phosphate and diammonium hydrogen phosphate; the antioxidant agent is ascorbic acid; the chemical formula of the manganese phosphate precursor is $Mn_3(PO_4)_2 \cdot 7H_2O$; the sintering is carried out in the box furnace at the sintering temperature of 350-600° C. for 1-5 h at the sintering atmosphere of nitrogen.

4. The preparation method according to claim 1, wherein in step S3, a molar ratio Fe/P in the slurry A is 0.958-0.998, and a molar ratio Li/Fe in the slurry A is 1.025-1.055; in the wet sanding, the particle size of the slurry A is controlled to D50=0.30-0.60 μm.

5. The preparation method according to claim 1, wherein in step S4, a molar ratio Mn/P in the slurry B is 0.958-0.998, and a molar ratio Li/Mn in the slurry B is 1.025-1.055; in the wet sanding, the particle size of the slurry B is controlled to D50=0.20-0.50 μm.

6. The preparation method according to claim 1, wherein in step S4, the organic carbon source is a mixture of glucose and polyethylene glycol, the addition amount of glucose is 5-10 wt % of the weight of the anhydrous manganese phosphate precursor, and the addition amount of polyethylene glycol is 1-5 wt % of the weight of the anhydrous manganese phosphate precursor; the dopant is one or more of titanium dioxide, ammonium metavanadate and niobium pentoxide, and the addition amount of the dopant is 0-2.5 wt % of the weight of the anhydrous manganese phosphate precursor; the dispersant is one or more of anionic polyacrylate dispersant TC108, non-ionic polymer TC311 and non-ionic polymer TC28, and the addition amount of the dispersant is 5-10 wt % of the weight of glucose.

7. The preparation method according to claim 1, wherein in step S5, the ball milling is carried out in a ball mill for 30-60 min; the spray drying is carried out under the atmosphere of nitrogen, an inlet air temperature is controlled to 180-240° C., and an outlet air temperature is controlled to 80-120° C.; the sintering is carried out in the box furnace at the sintering temperature of 600-800° C. for 8-20 h at the sintering atmosphere of nitrogen; in the air jet pulverization, the lithium manganese iron phosphate obtained by final pulverization is controlled to have of a particle size D10≥0.30 μm, D50 of 0.8-1.8 μm, and D90 of ≤18 μm.

* * * * *